United States Patent [19]

Bertocchio et al.

[11] Patent Number: 4,612,133

[45] Date of Patent: Sep. 16, 1986

[54] STABLE MIXTURES OF CHLOROFLUOROCARBONS AND SOLVENTS AND THEIR USE AS HEAT TRANSFER FLUIDS

[75] Inventors: Rene Bertocchio, Vourles-par-Vernaison; Bernard Genest, Courbevoie; Henri Mathais, Saint Didier au Mont d'Or, all of France

[73] Assignees: Atochem, Puteaux; Gaz de France, Paris, both of France

[21] Appl. No.: 752,167

[22] Filed: Jul. 3, 1985

[30] Foreign Application Priority Data

Jul. 6, 1984 [FR] France ................................ 84 10755
Jul. 6, 1984 [FR] France ................................ 84 10813

[51] Int. Cl.$^4$ ............................................... C09K 5/04
[52] U.S. Cl. ........................................ 252/68; 62/112; 62/114; 252/83; 252/69; 252/395; 252/406
[58] Field of Search ................... 62/112, 114; 252/33, 252/68, 69, 395, 406

[56] References Cited

U.S. PATENT DOCUMENTS

| | | | |
|---|---|---|---|
| 4,164,474 | 8/1979 | Gallacher et al. ........................ | 252/33 |
| 4,454,052 | 6/1984 | Shoji et al. ............................... | 252/68 |
| 4,455,247 | 6/1984 | Nakayama et al. ....................... | 252/68 |
| 4,557,850 | 12/1985 | Ando et al. ............................. | 252/68 |

FOREIGN PATENT DOCUMENTS 11035 1/1983 Japan.

Primary Examiner—Paul Lieberman
Assistant Examiner—Robert A. Wax
Attorney, Agent, or Firm—Brooks Haidt Haffner & Delahunty

[57] ABSTRACT

Compositions for use as fluids in absorption heat pumps, which compositions comprise a chlorofluoro-hydrocarbon heat exchange fluid, an amide or glycol-ether solvent vehicle, and at least one metal salt of an alkylarylsulfonate which stabilizes the fluid against decomposition, together with use of the compositions in absorption heat pumps.

13 Claims, No Drawings

STABLE MIXTURES OF CHLOROFLUOROCARBONS AND SOLVENTS AND THEIR USE AS HEAT TRANSFER FLUIDS

BACKGROUND OF THE INVENTION

The present invention relates to absorption heat systems and to novel stable compositions therefor, and more particularly, it relates to stable mixtures of chlorofluoro-hydrocarbons and solvents and to the use of such mixtures as heat transfer liquids for absorption heat pumps.

Absorption heat pumps are chiefly used at the present time for heating, especially for buildings. The operating principle of the absorption cycle of these pumps is that a working or heat transfer fluid (F) initially in the gaseous state is subjected to steps of condensation, expansion and vaporisation, and then absorption in a fluid (S). The solution obtained is put under pressure and a rise in temperature permits regeneration of the working fluid (F) to the gaseous state. The solvent is then returned to the absorption step.

The most widely used pairs of working fluid/solvent are ammonia/water and water/lithium bromide. Nevertheless, these pairs pose major disadvantages which prevent their use in certain areas, namely, in the field of single or multiple unit heating. In effect, the thermodynamically attractive ammonia/water pair's utility is of limited use due to the toxicity of the ammonia. The water/lithium bromide pair cannot be used at the low temperatures required at the evaporator in the heat pumps used for heating individual dwelling or multiple dwellings because of the crystallization of the water.

During the absorption cycle, it is important that the working fluid/solvent pair have good thermodynamic properties, a good solubility of the working fluid in the solvent, that it not be toxic, and that it not present any risk of crystallization.

It has already been suggested in Revue Generale Thermique, No. 236-237 for August/September, 1981, that fluorinated hydrocarbons be used in the heat transfer fluids with heavy compounds as solvents.

For one use in heat absorption pumps, the most attractive solvents are those which have the greatest difference of their boiling point from that of the heating fluid, and at the same time the greatest solubilization power. These two properties permit in effect the reduction of operating pressure and of the size of the apparatus and also lead to the most advantageous construction costs. The most used solvents are the glycol-ethers or amides. Among these latter, N-methylpyrrolidone are particularly outstanding for its high solvent capability for the chlorofluoro-hydrocarbons of the type $C_nH_{(2n+2-x-y)}F_xCl_y$ and more especially for those having one or more hydrogen atoms in their molecules, such as for example, $CF_3$-$CFClH$, $CF_2Cl$-$CF_2H$, $CF_3$-$CH_2Cl$, and $CF_2Cl$-$CH_3$. This high solubility is explained by the formation of intermolecular bonds of the hydrogen bond type between the N-methylpyrrolidone and the chlorofluoro-hydrocarbon working fluid.

The utilization of the chlorofluoro-hydrocarbon/amide or glycol-ether solvent pairs in the absorption cycle thus provides definite advantages. Nevertheless, these mixtures are not stable when they are heated in the presence of metals, particularly iron, as occurs in the boiler of the absorption heat pump. It is known that the chlorofluoro-hydrocarbons, heated in the presence of iron, aluminum, or copper and of hydrogen-donor compositions undergo a quantitative transformation with progressive substitution of all the chlorine atoms by hydrogen atoms. According to the reactivity of the R-H donor, a greater or lesser proportion of ethylenic derivatives is likewise formed. Thus, for example, 1-chloro-2,2,2-trifluoroethane leads simultaneously to 1,1,1-trifluoroethane and to vinylidene fluoride by the following reactions:

$CF_3$-$CH_2Cl + Fe \rightarrow CF_3$-$CH_2^* + FeCl^*$ $CF_3$-$CH_2^* + R$-$H \rightarrow CF_3$-$CH_3 + R^*$ $CF_3$-$CH_2^* + FeCl^* \rightarrow CF_2$=$CH_2 + FeFCl$ These reactions lead to a total modification of the physicochemical characteristics of the heat transfer liquid/solvent mixture and to the formation of tars with the liberation of hydrochloric acid. The attack on the metallic walls of the apparatus and especially on the boiler walls, the hottest point in the equipment, results in the formation of hydrogen, particularly impeding the proper functioning of the thermodynamic cycle, and also leads to the formation of metallic salts whose corrosive activity is well known. The modification of the nature of the heat exchange fluid/solvent pair, the effects of the corrosion, and particularly the formation of non-condensable gas, cause deterioration of the operating conditions of the heat pump and can very rapidly lead to taking the apparatus out of service. Accordingly, it is fundamental that the absorption cycle heating installation have a heat exchange fluid/solvent system that is stable over a ten-year operating period.

Mixtures of chlorofluoro-hydrocarbons and amide or glycolether solvents are very difficult to stabilize and as demonstrated hereinafter, numerous classes of stabilizers are shown to be totally or partially ineffective, particularly in the case of N-methylpyrrolidone.

THE INVENTION

It has now been found that alkylarylsulfonic acid metal salts do not present this difficulty and permit the effective stabilization of chlorofluoro-hydrocarbon/amide or glycol-ether solvent mixtures so that these mixtures can be brought without risk to temperatures distinctly higher than the normal temperature of contact with metals such as iron, aluminum, or copper.

The present invention accordingly provides stable mixtures of chlorofluoro-hydrocarbons and amide or glycol-ether vehicles, characterized in that they contain as a stabilizing agent at least one compound having the formula $(R_m$-$Ar$-$SO_3)_nM$, where R is a straight- or branched-chain alkyl radical containing from one to 15 carbon atoms; Ar is an aromatic group with one or more aromatic rings, such as phenyl or naphthyl; M is a metal atom, preferably an alkaline earth metal or zinc; m is an integer from 1 to 3; and n is a number corresponding to the metal's valence.

Barium dinonylnaphthalene sulfonate, calcium dodecylbenzenesulfonate, and zinc dinonylnaphthalene sulfonate are particularly preferred stabilizing agents in certain embodiments of this invention.

The stabilizing agent according to this invention should not alter the thermodynamic properties of the heat exchange fluid/ solvent pair. Nevertheless, the quantity of this stabilizing agent must be sufficient to inhibit the decomposition of the heat exchange fluid/solvent pair at temperatures up to 180 degrees C. The preferred range of the stabilizing agent is from 0.05 to 2.5 weight percent of the weight of the solvent in the mixture. In certain preferred embodiments of the invention, the amount of the stabilizing agent is from 0.5 to two percent by weight.

The chlorofluoro-hydrocarbons used in the practice of this invention are partially hydrogenated hydrocarbons having from one to three carbon atoms, that is, they have at least one hydrogen atom, and a boiling point of from −45 to +60 degrees C.

By way of example of the chlorofluoro-hydrocarbons which are used in the practice of this invention, chlorodifluoromethane, dichlorofluoromethane, chlorofluoromethane, 1-chloro-2,2,2-trifluoroethane, 1,1-dichloro-2,2,2-trifluoroethane, 1-chloro-1,2,2,2-tetrafluoroethane, 1,1-dichloro-2,2-difluoroethane, 1-chloro-1,2,2-trifluoroethane, 1-chloro-2,2-difluoroethane and their isomers and mixtures thereof are readily used. In certain embodiments of this invention, 1-chloro-1,2,2,2-tetrafluoroethane is particularly preferred.

The solvent component used in the practice of this invention includes amide type solvents, having at least one N-C=O linkage, and glycol ether solvents. Desirable amide solvent components used herein include N,N-dimethylformamide, N,N-diethylformamide, N-methylpyrrolidone, N,N-dimethylpropionamide, and mixtures thereof. A particularly preferred amide solvent in certain embodiments is N-methylpyrrolidone. Desirable glycol-ether solvents used herein include the dimethylether of triethylene glycol and the dimethylether of tetraethylene glycol.

The solvent fluid used in the compositions of this invention advantageously has a boiling point at least 150 degrees C. higher than the boiling point of the heat transfer fluid.

The relative amounts of the heat transfer fluid and the solvent in the compositions of this invention can vary over a range. This can readily be determined in a known manner, principally as a function of the working conditions of the absorption cycle. In certain embodiments of the invention, it is desirable to use from ten to 60 parts by weight of the heat transfer fluid with respect to the weight of the total mixture.

The mixture of chlorofluoro-hydrocarbons and solvents which is desirable as a heat transfer fluid for absorption heat pumps according to this invention is stable at high temperatures, even in contact with materials currently utilized in commercial practice in absorption units, such as ordinary steel, stainless steel, aluminum and its alloys, cast iron, copper, brass, and the like.

All parts, percentages, proportions, and ratios herein are by weight unless otherwise stated.

The following Examples are given to illustrate embodiments of the invention as it is presently preferred to practice it. It will be understood that these Examples are illustrative, and the invention is not to be considered restricted thereto except as indicated in the appended claims.

The following tests A and B are run without stabilization as a control. Tests C and D, carried out with prior art stabilizers, are for comparison with Examples I to IV which are given to illustrate the invention. The abbreviations used in the tests have the following meaning: R124 is 1-chloro-1,2,2,2-tetrafluoroethane, $CF_3$-CFClH; R133a is 1-chloro-2,2,2-trifluoroethane, $CF_3$-$CH_2Cl$; and NMP is N-methylpyrrolidone.

TEST A

A thick-walled Pyrex glass tube containing 3 g of NMP is charged with five millimoles of R124 and a 250 mg specimen of suitably cleaned stainless steel. The tube is cooled to the temperature of liquid nitrogen, sealed under vacuum, and raised to 180 degrees C. for 100 hours. It is then reimmersed in liquid nitrogen, connected to a vacuum line and opened with a suitable device. The liquid and gaseous contents are recovered and analyzed by gas phase chromatography. Analysis shows that 71% of the initial R124 has been reacted, including 61.7% to $CF_3$-$CFH_2$ and 7.8% to $CF_2$=CFH.

If this test is repeated with a piece of ordinary steel instead of the stainless steel, the amount of conversion of the R124 is 55.4%.

TEST B

A Pyrex glass tube containing 3 g of NMP is charged with five millimoles of R133A and a 250 mg specimen of suitably cleaned stainless steel, and the mixture is kept at 180 degrees C. for 100 hours. After opening the tube, it is found that 93.4% of the initial R133a has been converted, including 62.5% to $CF_3$-$CH_3$ and 24.5% to $CF_2$=$CH_2$.

If the test is repeated with a piece of plain steel instead of the stainless steel, the amount of decomposition is 76.1%, of which 60.4% is to $CF_3CH_3$ and ten percent is to $CF_2$=$CH_2$.

TEST C

The same mixture of R133A and NMP as used in Test B is submitted to the same test in the presence of metal specimens of stainless steel and three stabilizers known for their antioxidant properties. These materials are used at a concentration of 1.5% by weight with respect to the weight of NMP and they do not show any efficacy.

| Stabilizer | Amount of Decomposition of $CF_3CH_2Cl$ |
|---|---|
| beta-Naphthol | 93.8% |
| 1,3-Pentadiene | 95.2% |
| Allylmethylether | 89.2% |

TEST D

Proceeding as in the previous test with the pairs R133a/NMP and R124/NMP, 1.5% by weight of the NMP of various iron complexing agents are added to the pairs. At the end of 100-hour tests at 180 degrees C., the amounts of decomposition are as set out in Table I.

TABLE I

| Pair | Metal | Stabilizer | Extent of decomposition of the chlorofluorinated hydrocarbon |
|---|---|---|---|
| R133a/NMP | stainless steel | sulphosalicylic acid | 85.4% |
| R133a/NMP | " | 1,10-phenanthroline | 97.0% |
| R133a/NMP | " | disodium salt of ethylenediaminetetraacetic acid | 89.8% |
| R133a/NMP | ordinary steel | ethylenediaminetetra (methylenephosphonic) acid | 65.8% |
| R133a/ | " | 1-hydroxy-1,1-ethane- | 57.2% |

TABLE I-continued

| Pair | Metal | Stabilizer | Extent of decomposition of the chlorofluorinated hydrocarbon |
|---|---|---|---|
| NMP | | diphosphonic acid | |
| R133a/NMP | " | 1,10-phenanthroline | 57.8% |
| R133a/NMP | " | dipyridyl | 70.7% |
| R133a/NMP | " | sulphosalicylic acid | 51.9% |
| R124/NMP | " | 1,10-phenanthroline | 38.6% |
| R124/NMP | " | dipyridyl | 54.9% |
| R124/NMP | " | sulphosalicylic acid | 28.9% |

EXAMPLE I

A thick-walled Pyrex glass tube containing 5 mmoles of R124, 3 g of NMP, a 250 mg plain steel specimen, and 45 mg of Ninate 401 calcium dodecylbenzene sulfonate, made by Stepan Europe, is heated to 180 degrees C. for 100 hours.

At the end of the test, the amount of decomposition of the R124 is only 0.7% ($CF_3CFH_2$) and the mixture shows only a light coloration.

EXAMPLE II

The procedure of Example I is repeated except that the dodecylbenzene sulfonate is replaced with the same quantity (45 mg) of Nasul barium dinonylnaphthalene sulfonate, made by Ansul.

After 100 hours of heating at 180 degrees C., a faint coloration of the solvent is seen and chromatographic analysis of the gaseous mixture shows that only a very limited reaction of 1.9% of the R124 to $CF_3CFH_2$ takes place.

EXAMPLE III

The procedure of Example I is repeated except that 5 mmole of R133a is used instead of the R124 and the calcium dodecylbenzene sulfonate is replaced by the same amount of Nasul ZS zinc dinonylnaphthalene sulfonate, made by Ansul.

At the end of the 100 hour test at 180 degrees C., the amount of decomposition of the R133a is not above 0.9%.

EXAMPLE IV

Proceeding as in Example I, with the dodecylbenzene sulfonate replaced with the same amount of zinc dinonylnaphthalene sulfonate, the amount of decomposition of the R124 is only 3.4%.

What is claimed is:

1. A stable heat exchange medium for use in absorption type heat pumps, which medium comprises from ten to sixty percent by weight of the composition of a chlorofluoro-hydrocarbon heat exchange fluid, amide or glycol-ether solvent, and an from 0.05 to 2.5 percent of the weight of the solvent of at least one metal salt of an alkylarylsulfonate to stabilize the fluid against thermal decomposition.

2. A heat exchange medium according to claim 1 wherein the metal salt has the formula $(R_m\text{-}Ar\text{-}SO_3)_nM$, where R is a straight-or branched-chain alkyl group containing from one to 15 carbon atoms, m is one, two, or three, Ar is an aromatic group containing one or more aromatic rings, M is a metal atom, and n is an integer corresponding to the valence of the metal.

3. A heat exchange medium according to claim 2 wherein n is one or two and M is zinc or an alkaline earth metal.

4. A heat exchange medium according to claim 1 wherein the metal salt is calcium dodecylbenzene sulfonate or barium or zinc dinonylnaphthalene sulfonate.

5. A heat exchange medium according to claim 1 wherein the amount of the metal salt is from 0.5 to two percent of the weight of the solvent.

6. A heat exchange medium according to claim 1 wherein the chlorofluoro-hydrocarbon is chlorodifluoromethane, dichlorofluoromethane, chlorofluoromethane, 1,1-dichloro-2,2,2-trifluoroethane, 1-chloro-1,2,2,2-tetrafluoroethane, 1,1-dichloro-2,2-difluoroethane, 1-chloro-2,2,2-trifluoroethane, 1-chloro-2,2-difluoroethane, 1-chloro-1,2,2-trifluoroethane, or mixtures of two or more thereof.

7. A heat exchange medium according to claim 1 wherein the solvent is N,N-dimethylformamide, N,N-diethylformamide, N-methylpyrrolidone, N,N-dimethylpropionamide, the dimethylether of triethylene glycol, the dimethylether of tetraethylene glycol, or mixtures of two or more thereof.

8. A heat exchange medium according to claim 1 wherein the chlorofluoro-hydrocarbon is 1-chloro-2,2,2-trifluoroethane or 1-chloro-1,2,2,2-tetrafluoroethane and the solvent is N-methylpyrrolidone.

9. A method for transferring heat in absorption type heat pump systems which comprises using as the heat exchange medium a chlorofluoro-hydrocarbon heat exchange fluid, an amide or glycolether solvent, and an amount of at least one metal salt of an alkylarylsulfonate to stabilize the fluid against thermal decomposition, the metal salt having the formula $(R_m\text{-}Ar\text{-}SO_3)_nM$, where R is a straight- or branched-chain alkyl group containing from one to 15 carbon atoms, m is one, two, or three, Ar is an aromatic group containing one or more aromatic rings, M is a metal atom, and n is an integer corresponding to the valence of the metal wherein the chlorofluoro-hydrocarbon fluid is from ten to sixty percent by weight of the composition and the amount of the metal salt is from 0.05 to 2.5 percent of the weight of the solvent.

10. A method according to claim 9 wherein the chlorofluoro-hydrocarbon is chlorodifluoromethane, dichlorofluoromethane, chlorofluoromethane, 1,1-dichloro-2,2,2-trifluoroethane, 1-chloro-1,2,2,2-tetrafluoroethane, 1,1-dichloro-2,2-difluoroethane, 1-chloro-2,2,2-trifluoroethane, 1-chloro-2,2-difluoroethane, 1-chloro-1,2,2-trifluoroethane, or mixtures of two or more thereof.

11. A method according to claim 9 wherein the solvent is N,N-dimethylformamide, N,N-diethylformamide, N-methylpyrrolidone, N,N-dimethylpropionamide, the dimethylether of triethylene glycol, the dimethylether of tetraethylene glycol, or mixtures of two or more thereof.

12. A method according to claim 9 the solvent is the dimethylether of triethylene glycol or the dimethylether of tetraethylene glycol.

13. A method according to claim 9 wherein the chlorofluoro-hydrocarbon is 1-chloro-1,2,2,2-tetrafluoroethane, the solvent is N-methylpyrrolidone, and the stabilizer is barium or zinc dinonylnaphthalene sulfonate or calcium dodecylbenzene sulfonate.

* * * * *

UNITED STATES PATENT AND TRADEMARK OFFICE
CERTIFICATE OF CORRECTION

PATENT NO. : 4,612,133

DATED : September 16, 1986

INVENTOR(S) : RENE BERTOCCHIO ET AL

It is certified that error appears in the above-identified patent and that said Letters Patent is hereby corrected as shown below:

Column 5, line 59, before "amide" insert --an--.

Column 5, line 60, after "and" delete "an".

Column 6, line 60, after "claim 9" insert --wherein--.

Signed and Sealed this

Twenty-fourth Day of February, 1987

Attest:

DONALD J. QUIGG

Attesting Officer

Commissioner of Patents and Trademarks